United States Patent Office 3,812,011
Patented May 21, 1974

3,812,011
METHOD OF CONVERTING STARCH TO
β-CYCLODEXTRIN
Shigetaka Okada, Nara, and Naoto Tsuyama, Okayama, Japan, assignors to Hayashibara Biochemical Laboratories, Incorporated, Okayama-ken, Japan
No Drawing. Filed Mar. 29, 1972, Ser. No. 239,347
Claims priority, application Japan, Sept. 30, 1971, 46/76,485
Int. Cl. C12b 1/00; C07g 7/02
U.S. Cl. 195—31 R           5 Claims

ABSTRACT OF THE DISCLOSURE

The cell-free broth of a culture of Bacillus megaterium T 5 (ATCC 21737) or the enzyme recovered therefrom converts starch predominantly to β-cyclodextrin, and the latter can be obtained in high yields practically free of α- and γ-cyclodextrin by interrupting the fermentation at a suitable stage.

---

This invention relates to the production of β-cyclodextrin, and particularly to the conversion of starch to β-cyclodextrin by enzymatic fermentation.

Cyclodextrins, also referred to as Schardinger dextrins, are crystalline, cyclic oligosaccharides consisting of 6, 7, or 8 glucose units linked by α-1,4-bonds and designated by Greek letters α, β, γ according to increasing number of glucose units. They differ from each other in their specific optical rotations, their solubilities in water in the presence of organic solvents, and in the colors and crystal forms of the complexes which they form with iodine, α-dextrin giving blue hexagonal plates and needles, β-dextrin forming yellow, monoclinic prisms, and γ-dextrin yielding yellow needles or brown plates. The preparation of the three cyclodextrins and their properties have been described by Tilden and Hudson (JACS 64, 1432, 1942) and D. French (JACS 71, 353, 1949).

Cyclodextrins are obtained by hydrolysis of starch by an enzyme found in the cell-free broth of a culture of Bacillus macerans. α-Cyclodextrin is formed first, and the β- and γ-forms are formed thereafter. The resulting mixture may be fractionated by precipitation with toluene or trichloroethylene. Repeated precipitation is necessary when approximately pure compounds are to be produced.

It has now been found that several microorganisms isolated from soil produce a cyclodextrin glycosyltransferase which converts starch to β-cyclodextrin only, at least in the initial stages of fermentation, and that an enzyme produced by Bacillus megaterium T 5 (ATCC 21737, FERM-P 935) permits β-cyclodextrin to be produced directly from starch in very high yields before siginficant amounts of α-cyclodextrin are formed, particularly if the enzymatic hydrolysis of the starch is carried out in the presence of a precipitating agent for the β-cyclodextrin.

B. megaterium var. T 5 has the following properties:

MORPHOLOGICAL CHARACTERISTICS

Vegetative cells

Forms: 0.8 to 1.5 by 1.5 to 8.0μ, with rounded ends, sometimes with square or pointed ends. Rod-shaped, sometimes irregular, spindle-shaped, filamentous. Occurring singly, pair, in short chains or in filaments.
Protoplasm: When lightly stained with methylene blue, protoplasm granular and foamy. Protoplasm stained uniformly.
Shadow-form: Sometimes ghost form.
Motility: Motile.
Gram stain: Gram-positive. Occasionally gram-variable in bouillon medium at 35° C. for 1 to 3 days.
Budding: Buds at end or side of rods.

Spore and sporangia

Sporangia: Occasionally swollen laterally only on one side of sporangia.

Spore

Forms: 0.8 to 1.5 by 1.5 to 3.0μ, almost cylindrical, sometimes irregular, reniform, ellipsoidal or oval.
Position: Lateral.
Walls: Thin.
Formation: In 3 days at 35° C. in bouillon medium, only a few spores occur in a free state and sporangia are seldom recognized.

Growth on agar media

Colonies: Edge irregular with filamentous to arborescent outgrowths.
Agar slants: Growth moderate, rough, beaded, translucent to opaque, adherent, creamy white, echinulate. Edge without filamentous or arborescent outgrowths.
Glucose agar slants: Growth moderate, better than on agar, rough, translucent to opaque, non-spreading, adherent, creamy white, echinulate. Edge without filamentous or arborescent outgrowths.
Glucose nitrate agar slants: Growth abundant, opaque, rough, echinulate, creamy white.
Tyrosine agar slants: Growth moderate to abundant, beaded, rough, opaque, creamy white.
Soy bean agar slants: Growth moderate, rough, opaque, creamy white.
Milk agar streak plate: Wide zone of slow hydrolysis of the casein.
Potato: Growth moderate to abundant, rough, slightly glistening, echinulate, creamy white.
Potato agar slants: Growth moderate to abundant, rough, somewhat glistening, creamy white.

PHYSIOLOGICAL CHARACTERISTICS

Bouillon: Uniform turbidity followed by clearing and formation of small amounts of sediment. pH 7.2 at 35° C. in 10 days.
Glucose bouillon: Uniform turbidity followed by clearing and formation of slightly flocculent, moderate sediment with slight and fragile ring pellicle. pH 5.3 at 35° C. in 10 days.
Milk: Coagulated. Weakly peptonized.
NaCl-glucose bouillon: Growth up to a concentration of 4 percent NaCl. Faint to no growth in 5 percent.

Liquefaction of gelatin

Gelatin stab: Slow saccate liquefaction at 25° C.
Gelatin agar streak plate: Wide zone of liquefaction at 35° C.
Utilization of sugars: With ammonium salts as sole source of nitrogen, acid but no gas from glucose, sucrose, mannitol, arabinose, xylose at 35° C. for 7 days.
Hydrolysis of starch: Hydrolyzed.
Acetylmethylcarbinol: Not produced at 35° C. for 1 to 3 days.
Utilization of citrate as sole source of carbon: Utilized, no growth in Koser's citrate medium.
Nitrate reduction: Produced nitrite from nitrate.
Production of Indole: Not produced at 35° C. for 1 to 3 days.
Methylene blue reduction: Not reduced.
Oxygen demand: Aerobic. Faint or no growth in glucose bouillon under anaerobic conditions.
Growth temperature: Optimal temperature near 35° C. Maximum at 40° C.
pH of growth: Optimal pH between 6 and 7. No growth at pH 5.0.
Catalase: Positive.

B. megaterium T 5 grows readily in a medium providing sources of assimilable carbon and nitrogen and minor nutrients necessary for the growth of the microorganism, as may be provided, for example, by corn steep liquor, ammonium phosphate, ammonium sulfate, and potassium carbonate, under aerobic conditions. When the broth is centrifuged, the supernatant liquid has the desired enzyme activity and may be employed directly for hydrolyzing starch to $\beta$-cyclodextrin. A purer enzyme was obtained by stirring the supernatant with active charcoal for 30 minutes, removing the charcoal by centrifuging at 0° C. and 9000 r.p.m., precipitation by salting out with an ammonium sulfate solution, ⅔ saturated, and dialysis at 10° C. against running tap water. A pure enzyme solution has been prepared by chromatography on a column of a hydrophilic, insoluble, molecular sieve of cross-linked dextran (SE-Sephadex), elution with a buffer, and dialysis. The purified product had 17% of the total enzyme activity of the cell-free broth employed as a starting material.

The enzyme activity was measured by determining the transfer of soluble starch to sucrose by means of the enzyme in an aqueous medium. 1 ml. of the enzyme solution to be tested was mixed with 2 ml. 10% soluble starch solution, 2 ml. 10% sucrose solution, and 1 ml. 0.1 M acetate buffer solution (pH 5.5). The mixture was incubated at 40° C. for 15 minutes and 1 ml. thereof was diluted with 9 ml. 0.1 N HCl solution. One ml. of the acidified solution was mixed with 4 ml. N/200 I—KI solution and enough water to make 25 ml. and the transmittancy (optical density) of the resulting colored solution was determined at 660 m$\mu$. An enzyme solution causing a decrease in optical density by 10% in 15 minutes was considered to contain one unit of the cyclodextrin glycosyltransferase of the invention. The method is not reliable in the presence of $\alpha$-amylase.

The formation of cyclodextrin during the starch hydrolysis can be monitored by the formation of an insoluble complex with trichloroethylene, and the cyclodextrin formed can be identified as $\alpha$, $\beta$, or $\gamma$ by inspecting its crystalline iodine complex under the microscope.

A starch hydrolysis mixture containing 3 U./ml. of the enzyme recovered from the culture broth of B. megaterium T 5 was tested after 5, 10, 20, 30, 60, and 120 minutes for the presence of sufficient cyclodextrin to form a visible precipitate with trichloroethylene, for the presence of needle-shaped crystals in the iodine complex, and for the presence of $\alpha$- and $\beta$-cyclodextrin. Control tests were performed with the enzyme recovered by the same method from a culture of B. macerans, IFO 3490.

The enzyme of the invention produced $\beta$-dextrin and a precipitate with trichloroethylene within 5 minutes, did not produce identifiable amounts of $\alpha$-cyclodextrin until after 20 minutes, and did not produce needle-shaped crystals with iodine even after 120 minutes. The enzyme of B. macerans produced $\alpha$-cyclodextrin and needle-shaped, iodine complex crystals within 5 minutes, produced the first trace amounts of $\beta$-cyclodextrin after 30 minutes, and significant amounts of $\beta$-cyclodextrin only after 120 minutes. The first precipitation with trichloroethylene was observed after 10 minutes, but sizable precipitates were formed only after 20 minutes.

At the conclusion of the test, the hydrolysis mixture containing the enzyme of B. megaterium T 5 contained 32.8% unreacted starting material and 67.2% cyclodextrin as compared to corresponding values of 45.0% and 49.2% in the hydrolysis mixture containing the enzyme of B. macerans. The weight ratio of $\alpha$- and $\beta$-cyclodextrin in the product was 2:98 for the enzyme of B. megaterium T 5 and 15.85 for the enzyme of B. macerans.

The $\alpha$-cyclodextrin in hydrolysis mixtures containing the enzyme of B. megaterium T 5 is produced by further conversion of the initially formed $\beta$-cyclodextrin, and can thus be held to a minimum by suitably selecting the reaction time. For a reaction time of ten minutes, the optimum reaction temperature is 55° C. at pH 5.5, and the enzyme is inactivated under these conditions. It is stable for two hours at 40° C. at pH 7.0–9.0. No specific inhibitor has been found. Its molecular weight could not be determined since it could not be crystallized. It is believed to be a peptide whose isoelectric point was determined at pH 6.60 by focusing electrophoresis. The isoelectric point of the enzyme of B. macerans is 4.62 under the same conditions, and the two enzymes are apparently quite different from each other, not only in their fermentation activity.

$\beta$-Cyclodextrin is readily produced by means of the enzyme of B. megaterium T 5 from corn starch, waxy corn starch, amylomaize starch, sweet potato starch, and potato starch. Soluble starch and amylose may also be employed as starting materials. The starch is preferably dispersed in water at 100°–170° C. or liquefied enzymatically at 80° to 95° C. to a dextrose equivalent of 10 or less prior to fermentation.

For rapid formation of the desired $\beta$-cyclodextrin, the solubilized starch is mixed with 5 to 15 units of the enzyme of B. megaterium T 5 per gram of starch, and the reaction solution should have a pH of 4.0–9.0, best results usually being obtained at pH 5.5. In order to prevent premature inactivation of the enzyme, the reaction temperature should not exceed 50° C., and is preferably held between 30° and 40° C., a temperature of less than 15° C. not being recommended. Under most economical conditions, the concentration of $\beta$-cyclodextrin reaches its maximum after 3 to 4 days, but quicker results can be obtained by increasing the enzyme concentration or by raising the fermentation temperature. Ultimately, reducing sugars are obtained by extended fermentation.

Trichloroethylene forms a complex compound with $\beta$-cyclodextrin which is insoluble in very cold water. Since trichloroethylene does not inhibit the enzyme, it may be added initially to the fermentation mixture and causes an increase in yield by several percent. After the end point of the fermentation is determined by the reaction of the fermentation mixture with iodine, the mixture is agitated vigorously in the presence of the trichloroethylene and cooled to a temperature of 5° C. or less to precipitate crystals of the complex compound. The crystals are recovered by centrifuging, washed with water, and decomposed by evaporating the trichloroethylene. The product so obtained contains 98% to 99% $\beta$-cyclodextrin. Any $\alpha$-cyclodextrin formed remains in the supernatant.

Further purification is readily achieved by dissolving the product in water, and again precipitating crystalline complex compounds of $\beta$-cyclodextrin and trichloroethylene. After evaporation of the solvent, practically pure $\beta$-cyclodextrin free from $\alpha$- and $\gamma$-cyclodextrin is obtained. The trichloroethylene may be replaced by bromobenzene or toluene which form similar complexes, and different organic solvents may be employed to advantage in the two precipitation steps.

The following examples further illustrate the invention.

EXAMPLE 1

A sterilized aqueous medium containing 0.5% corn steep liquor, 1% soluble starch, 0.25% $(NH_4)_2HPO_4$, 0.25% $(NH_4)_2SO_4$ and 1% $CaCO_3$ was inoculated with B. megaterium T 5 and incubated at 37° C. for two days with stirring. The broth contained 18–20 units/ml. enzyme activity. The microbial cells were removed by centrifuging at 0° C. and the supernatant having a volume of 1450 ml. was found to contain 11.2 units/ml. of cyclodextrin glycosyltransferase activity, for a total of 16250 units, and 9720 mg. protein.

After decolorizing treatment with active charcoal and centrifuging, 1370 ml. of the purified liquid had an activity of 9.4 units/ml., a total activity of 12880 units, and contained 6040 mg. protein. Salting out with 65% saturated ammonium sulfate and dialysis against tap water reduced the volume to 180 ml., and raised enzyme activity to 36.0 units/ml. for a total of 6480, while total protein was reduced to 180 mg. After further treatment with SE-Sephadex, the residual 170 ml. of purified enzyme solution had a total activity of 2820 units (16.6 units/ml.) and a total protein content of 17.10 mg. In terms of units of specific activity per mg. protein, the purification improved the enzyme concentration from 1.67 units/mg. to 165 units/mg.

500 milliliters 10% soluble starch solution, 25 ml. enzyme solution, and 100 ml. trichloroethylene were mixed and stored at 30° C. The mixture was agitated for 30 minutes every morning. After one day, 10 ml. of the enzyme solution, and every day thereafter, 5 ml. enzyme solution and 20 ml. trichloroethylene were added. After five days, the mixture was stirred 3 to 4 hours at 5° C. and centrifuged to recover the crystals formed which were washed with water and heated on a water bath to evaporate the trichloroethylene. A sample analyzed by paper chromatography (quadruple development with n-butanol-pyridine-water 6:4:3) and thereafter developed for color with an M/50 solution of iodine in KI solution showed 2% impurities. The product therefore was agitated for four hours at 5° C. in aqueous solution with bromobenzene. The precipitated complex crystals were decomposed and pure β-cyclodextrin was recovered in an amount corresponding to 67% of the starch initially employed.

In a control run with the enzyme of B. macerans under the same conditions, it was not possible to obtain a primary product containing more than 85% β-cyclodextrin, and the yield was only 41%.

EXAMPLE 2

A mixture of 61.0 g. soluble starch (18% moisture), 50 ml. pure enzyme solution prepared from *B. megaterium* T 5 as described in Example 1, 130 ml. trichloroethylene, and 500 ml. water was incubated at 30° C. for four days and stirred once or twice every day. Ultimately, it was stirred vigorously at 5° C. for three hours and centrifuged at 0° C. The recovered crystals were washed with water, heated to 100° C. to remove the trichloroethylene, and then dried in a vacuum. They weighed 34.1 g. for a yield of 68.2% based on the dry weight of the starch employed as a starting material. A portion of this first crop was retained for analysis, and the remainder was dissolved in one liter of warm water and again crystallized at 3° C. by standing for 20 hours. The crystals were recovered, and the mother liquor was evaporated to 170 ml., cooled, and centrifuged to recover a third crop of crystalline material. The yield of recrystallized β-cylcodextrin was 61%, based on the initial starch.

The first and the combined second and third crops gave only a single, yellow spot in a paper chromatogram with quadruple development using n-butanol-pyridine-water 6:4:3 and color development with iodine solution. The specific rotations $\alpha_D^{20}$ (C=0.5 were +157.5° and +162.5° respectively, reducing sugars present amounted to 0.061% and 0.037% respectively (as glucose). They thus were practically pure and very pure β-cyclodextrin, free from α-cyclodextrin in view of the values of $\alpha_D$.

EXAMPLE 3

Purified corn starch was liquefied at 85°–90° C. by means of a liquefying enzyme until a dextrose equivalent of 5–10 was reached, whereupon the reaction mixture was cooled. One milliliter of the enzyme solution prepared in Example 1 was added to the starch solution for each gram of starch present, and the mixture was incubated at 30° C. for 4.5 days. Thereafter, an excess of trichloroethylene was added, and the mixture was stirred vigorously for five hours at a temperature a few degrees above 0° C. The precipitate formed was recovered by centrifuging, washed, and decomposed as described above. The product so obtained amounted to 62% of the starch originally present and essentially consisted by β-cyclodextrin.

EXAMPLE 4

The procedure of Example 2 was modified by adding 15 units isoamylase obtained from Pseudomonas to the fermentation mixture in addition to the cyclodextrin-glycosyl transferase. All other conditions and manipulative steps were repeated without change. The products obtained did not significantly differ in purity from those described in Example 2. The yields were higher by 3% both in the relatively crude first crop and the recrystallized second and third crops.

What is claimed is:

1. A cyclodextrin glycosyltransferase capable of converting soluble starch to β-cyclodextrin free from α-cyclodextrin after exposure of said starch to said cyclodextrin glycosyltransferase for 10 minutes at 55° C. in an aqueous solution at a pH of 5.5, said transferase being an extracellular product of metabolism of *Bacillus megaterium* T 5 (ATCC 21737).

2. A method of producing β-cyclodextrin from starch which comprises contacting said starch with the cyclodextrin glycosyltransferase set forth in claim 1 in an aqueous solution at pH 4.0 to 9.0, and at a temperature of 15° to 50° C. until said β-cyclodextrin is formed and accumulates in said solution, and recovering the accumulated β-cyclodextrin in substantially pure form.

3. A method as set forth in claim 2, wherein said β-cyclodextrin is recovered from said aqueous solution as a complex compound with a precipitating agent selected from the group consisting of trichloroethylene, bromobenzene, and toluene.

4. A method as set forth in claim 3, wherein said precipitating agent is in contact with said aqueous solution while said starch is being contacted with said cyclodextrin glycosyltransferase.

5. A method as set forth in claim 2, wherein said cyclodextrin glycosyltransferase is recovered from said medium prior to said contacting thereof with said starch.

References Cited

UNITED STATES PATENTS 3,425,910   2/1969   Armbruster et al. _____ 195—31

OTHER REFERENCES

Report of the Commission on Enzymes, 1961, Pergamon Press, p. 90.

ALVIN E. TANENHOLTZ, Primary Examiner

T. G. WISEMAN, Assistant Examiner

U.S. Cl. X.R.

195—62, 66 R